United States Patent [19]

McKinney

[11] 4,077,007
[45] Feb. 28, 1978

[54] RADIO MOUNTED IN A HELMET

[75] Inventor: Robert D. McKinney, Manhattan, Kans.

[73] Assignee: The Raymond Lee Organization, New York, N.Y.

[21] Appl. No.: 673,852

[22] Filed: Apr. 5, 1976

[51] Int. Cl.² ............................................. H04B 1/08
[52] U.S. Cl. ...................................... 325/315; 325/361
[58] Field of Search ................. 325/16, 310, 315, 317, 325/352, 361

[56] References Cited

U.S. PATENT DOCUMENTS

| 2,904,645 | 9/1959 | Sarles | 325/361 |
| 3,243,708 | 3/1966 | Manson | 325/317 |

FOREIGN PATENT DOCUMENTS

| 2,289,072 | 5/1976 | France | 325/16 |
| 974,901 | 11/1964 | United Kingdom | 325/361 |

Primary Examiner—Benedict V. Safourek
Attorney, Agent, or Firm—Stephen Wyden

[57] ABSTRACT

A helmet has an antenna mounted within the helmet, a set of ear phones mounted within the insulating material of the helmet adjacent to a user's ears, a battery compartment mounted within a recessed panel in a side of the helmet, a volumn control and on off switch and AM FM switch and AM controls and FM controls mounted in the recess of the panel, and a visor is mounted to a front of the helmet.

1 Claim, 3 Drawing Figures

RADIO MOUNTED IN A HELMET

I have invented a new and novel radio mounted in a helmet for a motorcycle rider. My radio provides AM and FM reception and incorporates an antenna within the helmet and at the same time utilizes the insulating qualities of the helmet to provide a cushion for the speakers.

My invention can be understood in view of the accompanying figures.

Figure 1:
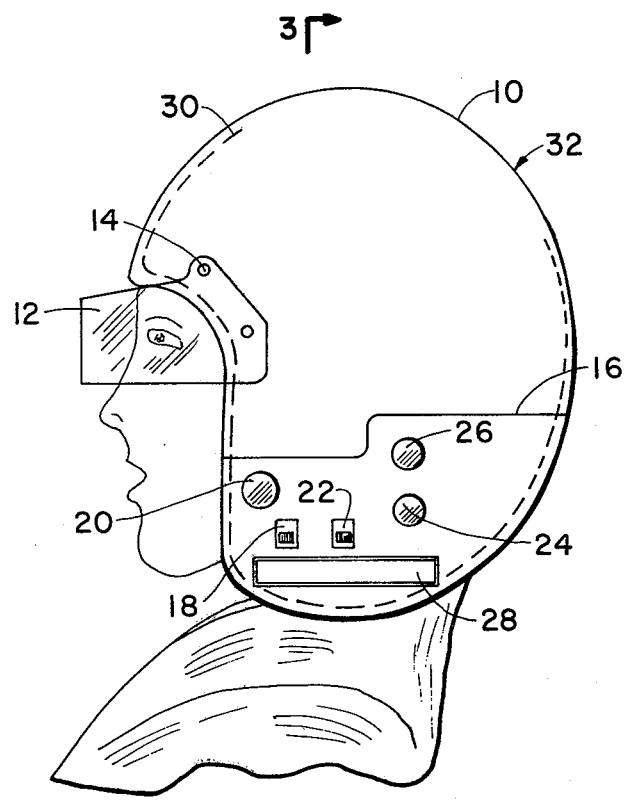
FIG. 1 is a side view of the helmet mounted on a motorcyclist.
Figure 2:
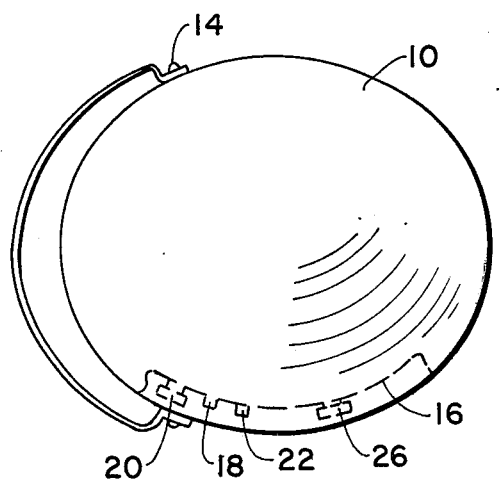
FIG. 2 is a top view of the helmet.
Figure 3:
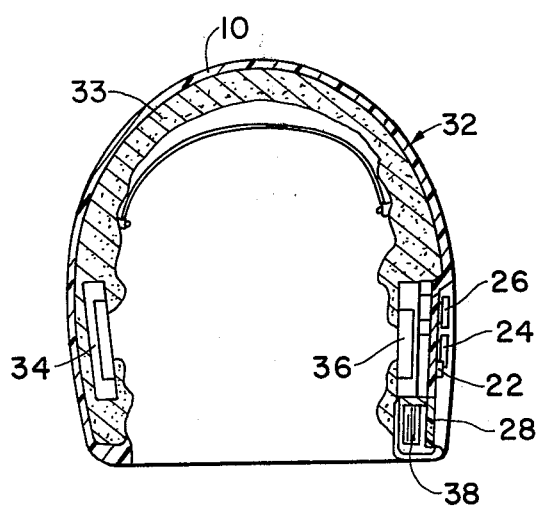
FIG. 3 is a section of the helmet as seen in FIG. 1 taken along the plane 3—3 of FIG. 1.

With regard to FIGS. 1, 2 and 3, on a helmet 10 a visor 12 is attached by rivets 14. A recessed panel 16 on a side of the helmet has an on off switch 18 mounted thereon as well as a volumn control 20 and an AM and FM switch 22. Separate controls are provided for the AM band 24 and for the FM band 26 while a compartment 28 can hold the batteries necessary for the operation of this radio. The antenna 30 is mounted within the helmet 10. The electrical components 32 of the radio are mounted within the insulating material 33 and the ear phones or speakers 34 and 36 are also embedded within the insulating material 33 of the helmet.

A battery 38 can be seen within the battery compartment 28.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. A radio mounted in a motorcycle helmet, comprising:
   a helmet,
   an insulating material mounted within the helmet,
   a set of electrical radio components mounted within the insulating material of the helmet,
   an antenna mounted within the helmet and connected to the components,
   a set of speakers each mounted in a portion of the helmet adjacent to a position for a user's ears and each speaker cushioned by the insulating material of the helmet,
   the helmet forming a recessed panel on one exterior surface of the helmet,
   an off switch mounted in the panel and connected to the electrical components,
   a volume control mounted on the panel and connected to the electrical components,
   an AM and FM switch mounted on the panel and connected to the electrical components,
   a battery compartment mounted within the panel,
   a battery removably mountable in the battery compartment and electrically connectable to the electronic components,
   an AM control mounted on the panel and connected to the electrical components, and
   an FM control mounted on the panel and connected to the electrical components, whereby a motorcyclist may listen to the radio while riding the motorcycle.

* * * * *